(12) United States Patent
Park et al.

(10) Patent No.: US 8,588,699 B2
(45) Date of Patent: Nov. 19, 2013

(54) APPARATUS AND METHOD FOR AVOIDING CHANNEL INTERFERENCE IN A SINGLE CHANNEL SENSOR NETWORK

(75) Inventors: Yong-Suk Park, Seoul (KR); Jeong-Sik In, Gyeonggi-do (KR); Soon-Seob Han, Seoul (KR); Doo-Seop Eom, Seoul (KR); Jin-Woo Kim, Gyeonggi-do (KR)

(73) Assignees: Samsung Electronics Co., Ltd. (KR); Korea University Research and Business Foundation (KR)

( * ) Notice: Subject to any disclaimer, the term of this patent is extended or adjusted under 35 U.S.C. 154(b) by 196 days.

(21) Appl. No.: 12/941,623

(22) Filed: Nov. 8, 2010

(65) Prior Publication Data

US 2011/0111701 A1    May 12, 2011

(30) Foreign Application Priority Data

Nov. 6, 2009  (KR) .................. 10-2009-0106837

(51) Int. Cl.
*H04B 1/00* (2006.01)
*H04B 15/00* (2006.01)
(52) U.S. Cl.
USPC .................. 455/63.1; 455/67.11; 455/450
(58) Field of Classification Search
USPC ......... 455/450, 452.1, 452.2, 41.2, 41.3, 507, 455/509, 63.1, 67.11
See application file for complete search history.

(56) References Cited

U.S. PATENT DOCUMENTS

| | | | |
|---|---|---|---|
| 2003/0040319 A1* | 2/2003 | Hansen et al. | 455/452 |
| 2008/0188231 A1* | 8/2008 | Zhu et al. | 455/450 |
| 2009/0227263 A1* | 9/2009 | Agrawal et al. | 455/452.1 |

OTHER PUBLICATIONS

Guinian Feng et al., "Minimizing Interferences in Wireless Ad Hoc Networks through Topology Control", 2008.
K. Shuaib et al., "Co-existence of Zigbee and WLAN, A Performance Study", Apr. 2006.
Emanuele Toscano et al., "Cross-Channel Interference in IEEE 802.15.4 Networks", May 21, 2008.
Gang Zhou et al., "RID: Radio Interference Detection in Wireless Sensor Networks", Mar. 13, 2005.
Chulho Won et al., "Adaptive Radio Channel Allocation for Supporting Coexistence of 802.15.4 and 802.11b", 2005 IEEE 62nd Vehicular Technology Conference (VTC2005-Fall), Sep. 25, 2005.
Soo Young Shin et al., "Mutual Interference Analysis of IEEE 802.15.4 and IEEE 802.11b", Science Direct, Computer Networks 51 (2007).
M. Bertocco et al., "Assessment of Out-of-Channel Interference Effects on IEEE 802.15.4 Wireless Sensor Networks", IEEE International Instrumentation and Measurement Technology Conference, May 12, 2008.

* cited by examiner

*Primary Examiner* — Ping Hsieh
(74) *Attorney, Agent, or Firm* — The Farrell Law Firm, P.C.

(57) ABSTRACT

A method of avoiding a channel interference in a single channel sensor network, includes periodically measuring an energy of a channel used by at least one node included in the sensor network; exchanging the measured energy of the channel with a neighbor node of the at least one node; receiving energy of all nodes of the sensor network and determining if there is an interference, by a coordinator node, which is a highest node of the at least one node; and when it is determined that there is an interference, switching a channel influenced by the interference to a channel which has been scanned by the coordinator node and is not influenced by the interference, thereby avoiding an influence of the interference.

12 Claims, 6 Drawing Sheets

APPARATUS AND METHOD FOR AVOIDING CHANNEL INTERFERENCE IN A SINGLE CHANNEL SENSOR NETWORK

PRIORITY

This application claims priority under 35 U.S.C. §119(a) to an application entitled "Apparatus And Method For Avoiding Channel Interference In A Single Channel Sensor Network" filed in the Korean Industrial Property Office on Nov. 6, 2009 and assigned Serial No. 10-2009-0106837, the contents of which are incorporated herein by reference.

BACKGROUND OF THE INVENTION

1. Field of the Invention

The present invention generally relates to a sensor network, and more particularly to a method for detecting and avoiding external interference which can detect a channel interference, which may occur in the same network system or a different type network system using the same frequency band, by using an energy contour.

2. Description of the Related Art

Since frequency bands being currently used are shared by commercialized networks, such as a wireless LAN or Bluetooth®, they cannot avoid frequency interference, which may degrade communication speed or cause a network interruption. The same can be applied to a sensor network, and various studies for overcoming such interference are in progress.

The existing network interference avoiding technologies transmit a separate frame in order to detect the interference or overcome the interference problem between sensor nodes within a network by using a topology control. The separate frame is periodically transmitted in order to detect the interference, and the topology control refers to a method of avoiding the interference by controlling its own transmission power when interference from a network of the same type or a different type is detected. The method of controlling the topology is shown in FIG. 1.

FIG. 1 illustrates an example of a conventional method of avoiding interference between networks by using a topology control. As shown in FIG. 1, when interference from another network is detected, it is possible to avoid the interference by reducing the transmission power to a range capable of preventing the interference.

However, the existing methods as described above have several problems. First, in the method of transmitting a separate frame, since a separate frame is periodically and continuously transmitted in order to detect the interference, an energy loss due to the interference is inevitable.

Next, in the method of reducing the transmission power through topology control, other nodes that are not subjected to the interference may escape from the transmission range, and additional energy consumption may be necessary in order to connect the nodes escaping from the transmission range through another network. In other words, in the method of reducing the transmission power, although the problem of the nodes escaping from the transmission range can be solved by constructing a new topology, it is impossible to avoid an additional energy consumption due to the construction of a new topology and a communication interruption during the construction of the new topology. Moreover, the method of topology control cannot be a good solution in a Time Division Multiple Access (TDMA) system, which is sensitive to scheduling.

The technology of avoiding the interference by using the topology control cannot avoid interference from a different type network system using a different protocol. For example, in the case of a Radio Interference Detection (RID) algorithm, which is one of the interference detection algorithms in the Institute of Electrical and Electronics Engineers (IEEE) 802.15.4 system, a transmission node sequentially broadcasts a High power Detection (HD) packet and a Normal power Detection (ND) packet, and a reception node can predict the degree of interference by detecting the transmission power difference between the HD packet and the ND packet. However, since this algorithm defines only the interference, which may occur between nodes using the IEEE 802.15.4 protocol, this algorithm is inevitably vulnerable to interference occurring between different types of networks. Further, since this algorithm also employs a transmission of a separate frame in order to detect the interference, it requires additional energy consumption for the transmission of a separate frame.

The methods described above do not take the mobility of a node or an interference source into account, while most of mobile terminals connected to a wireless Local Area Network (LAN) have a strong mobility. Therefore, there has been a necessity for a solution relating to this problem, but there is no sufficient study relating to this problem.

SUMMARY OF THE INVENTION

Accordingly, the present invention has been made to solve the above-mentioned problems occurring in the prior art, and the present invention provides a method for rapidly detecting the existence or absence of a channel interference and moving to a new channel that is not influenced by an interference, by using an energy contour.

In accordance with an aspect of the present invention, there is provided a method for avoiding a channel interference in a single channel sensor network, the method including periodically measuring an energy of a channel used by at least one node included in the sensor network; exchanging the measured energy of the channel with a neighbor node of said at least one node; receiving energy of all nodes of the sensor network and determining if there is an interference, by a coordinator node, which is a highest node of the at least one node; and when it is determined that there is an interference, switching a channel influenced by the interference to a channel, which has been searched for by the coordinator node and is not influenced by the interference, thereby avoiding an influence of the interference.

In accordance with another aspect of the present invention, there is provided a system for avoiding a channel interference in a single channel sensor network, the system including at least one node for periodically measuring an energy of a channel used by the at least one node, exchanging the measured energy of the channel with a neighbor node of the at least one node, and transmitting a channel energy of the at least one node to a higher node; and a coordinator node for receiving energy of all nodes of the sensor network, determining based on the received energy if there is an interference, and, when it is determined that there is an interference, searching for a channel which is not influenced by the interference, and switching a channel influenced by the interference to the channel which is not influenced by the interference.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, various specific definitions found in the following description are provided only to help general understanding of the present invention, and it is apparent to those skilled in the art that the present invention can be implemented without such definitions.

According to the present invention, at least one node included in a range of a sensor network detects an interference by itself without intervention of a higher node by employing a reception rate of a beacon frame and an Energy Detection (ED) scan scheme. According to the ED scan scheme, which is one of schemes to be used in a network layer as a part of a channel selection algorithm, an intensity of a signal received in a bandwidth of a channel is measured. Since the ED scan scheme does not identify or decode a signal on a channel, it only can determine if a channel is used. According to the present invention, at least one node included in a range of a sensor network measures an energy level of a currently used wireless channel by using the ED scan scheme as described above.

Figure 1:
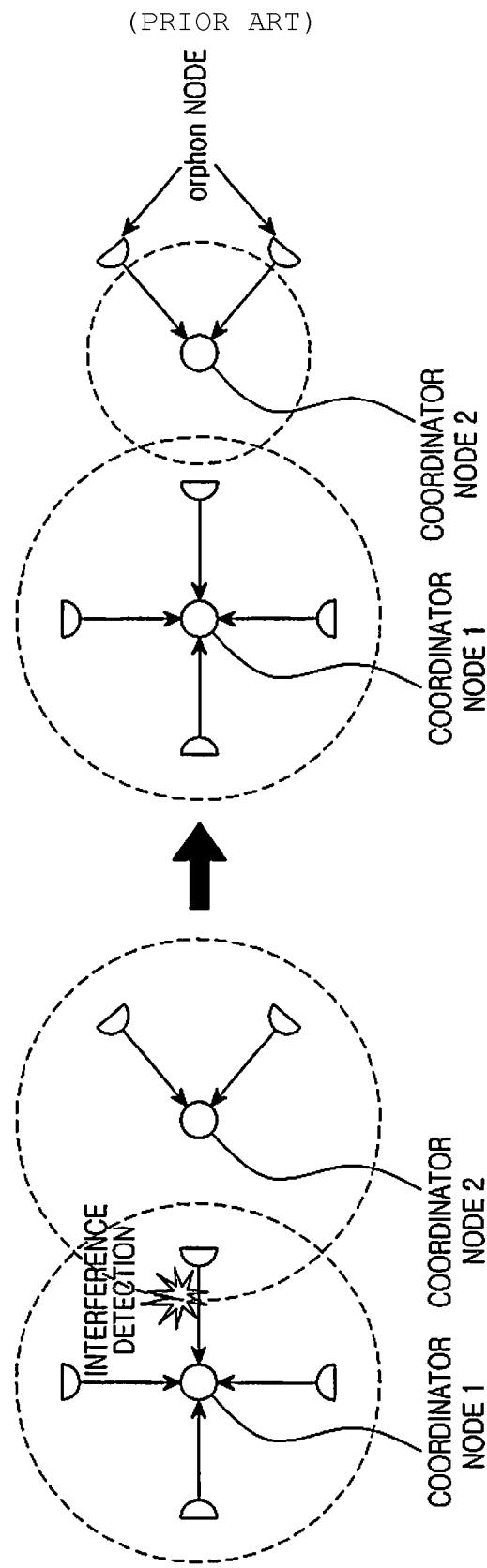
FIG. 1 illustrates an example of a conventional method of avoiding interference between networks by using a topology control.
Figure 2:
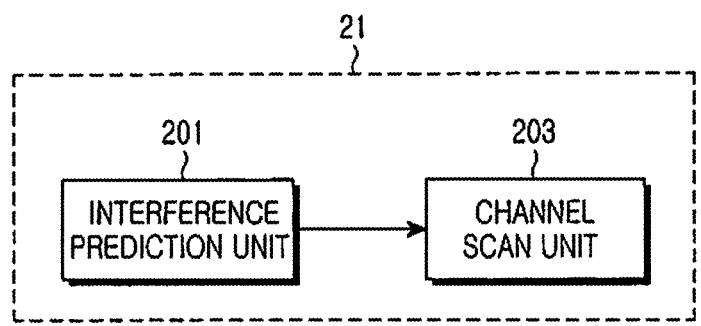
FIG. 2 is a block diagram illustrating an internal structure of a node included in a range of a sensor network according to an embodiment of the present invention.

FIG. 2 is a block diagram illustrating an internal structure of a node included in a range of a sensor network according to an embodiment of the present invention. The node 21 included in a range of a sensor network according to an embodiment of the present invention includes an interference prediction unit 201, and a channel scan unit 203.

Referring to FIG. 2, the interference prediction unit 201 measures an energy level of a currently used wireless channel by using an ED scan scheme, exchanges the measured energy levels between neighbor nodes, and then plots an energy contour based on the exchanged energy levels, thereby determining the state of the currently used channel and if there is an interference. Thereafter, when an interference to the currently used channel has been identified, the interference prediction unit 201 notifies the channel scan unit 203 of information on the identified interference. Upon receiving the information on the identified interference from the interference prediction unit 201, the channel scan unit 203 scans surrounding channels. When a free channel is found, the channel scan unit 203 transmits it to a coordinator node, which is the highest node.

As described above, by using a new interference prediction technology using an energy level measured through a periodically performed ED scanning, the interference prediction unit 201 can determine if there is an interference to the currently used channel, even without a separate reception frame, and can optionally determine the period of the ED scanning. Hereinafter, a process of predicting an interference through the interference prediction unit 201 will be described in detail.

Figure 3:
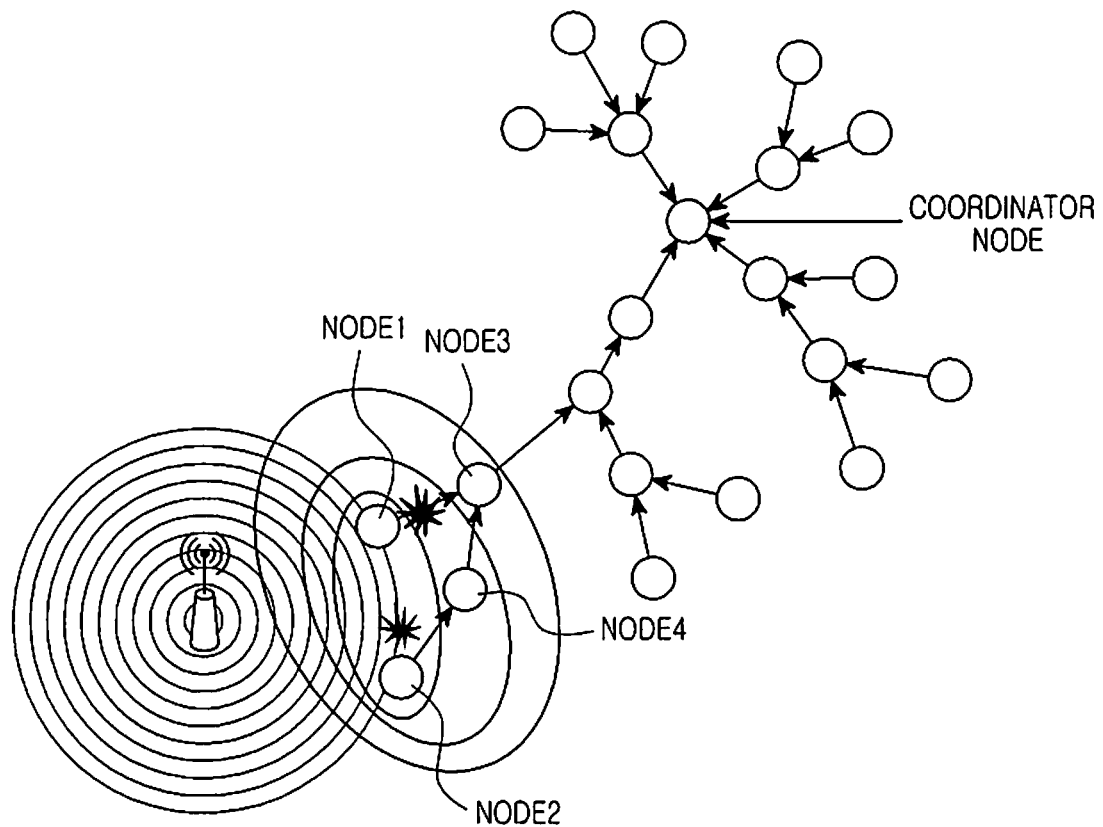
FIG. 3 illustrates an example of a process of determining an interference by using an energy contour in a sensor network system according to an embodiment of the present invention.

FIG. 3 illustrates an example of a process of determining an interference by using an energy contour in a sensor network system according to an embodiment of the present invention. Although interference sources may include various types of networks, FIG. 3 is based on an assumption that a most widely used wireless LAN is considered as an interference source.

Referring to FIG. 3, nodes #1 and #2 periodically perform an ED scanning and exchange measured energy levels with energy levels of nodes #3 and #4, which are neighbor nodes of nodes #1 and #2. At this time, since nodes #1 and #2 are subjected to a direct influence from a wireless LAN, they have high energy levels. In contrast, since nodes #3 and #4 are located out of the range subjected to a direct influence from a wireless LAN, they have low energy levels.

The exchange of energy levels can be continuously performed between neighbor nodes, and already exchanged energy level information of another node is exchanged again. Through the process described above, the coordinator node, which is the highest node of the corresponding sensor network, can acquire energy levels of the nodes directly or indirectly connected to the corresponding node. By plotting an energy contour based on such a change in the energy level, it is possible to determine if there is an interference and to determine the degree of the interference.

For example, if the energy levels of most of nodes within the sensor network are high, it is possible to conclude that there is severe interference from an interference source, such as a wireless LAN. In contrast, if only the energy levels of a small number of nodes from among the nodes within the sensor network are high, it is possible to conclude that there is a relatively small interference from an interference source. As described above, when an interference is detected in the whole area or a particular area, the coordinator node can scan another channel and can switch the current channel to a new channel, which is not influenced by an interference, in order to avoid the interference.

Figure 4:
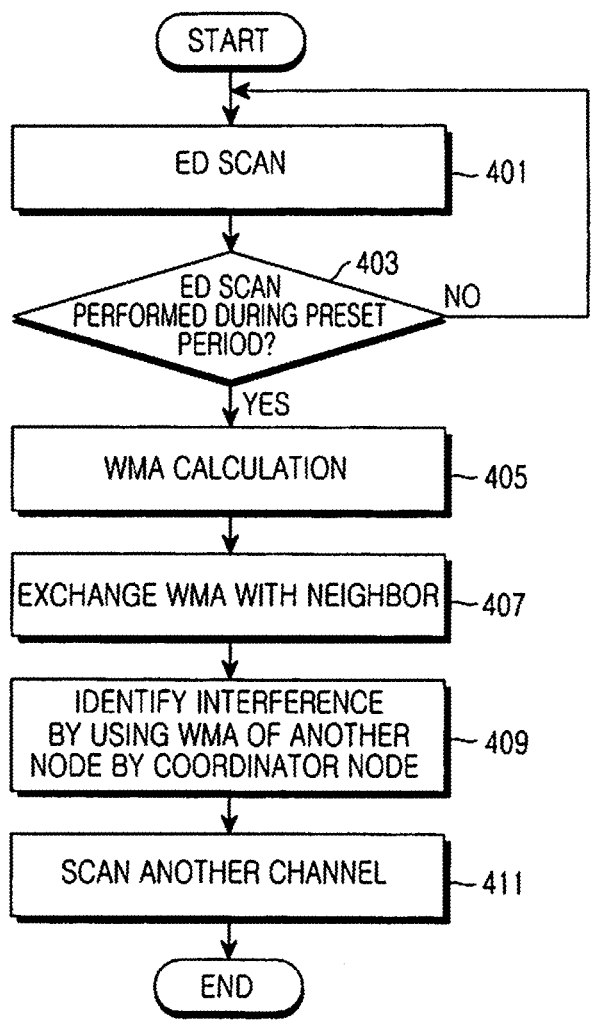
FIG. 4 is a flowchart showing a process of predicting and determining an interference according to an embodiment of the present invention.

FIG. 4 is a flowchart of a process for predicting and determining an interference according to an embodiment of the present invention.

Referring to FIG. 4, in step 401, a particular node performs an ED scan in order to determine if there is an interference. As described above, the period of the ED scan can be optionally determined when implemented. When there is no data frame received in a time slot at which the node is activated, a network system using a TDMA scheme can perform an ED scan. In step 403, the particular node determines if an ED scan has been performed during a preset period, wherein the preset period refers to a period of a super-frame, and it is possible to obtain an exact result of the interference determination, only by performing the ED scan during the preset period. When the ED scan has been performed for longer than the preset period, the particular node proceeds to the next step. Then, in step 405, the particular node does not reflect the result of energy measurement through the periodically performed ED scan in the interference prediction and determines if there is an interference, by applying a Weighted Moving Average (WMA) for a more exact determination. Values applied to the WMA can be expressed by Equation (1) below.

$$WMA = \frac{w_{i,t-k}x_{i,t-k} + \ldots + w_{i,t}x_{i,t}}{w_{i,t-k} + \ldots + w_{i,t}} \quad (1)$$

In Equation (1), k refers to the size of a WMA window, $x_{i,t}$ refers to an energy value on a channel measured through the ED scan at node i and time t, and $w_{i,t}$ refers to a weight for the WMA and linearly increases according to time in order to give a larger weight to a more recently measured value. The size of a window for applying the WMA can be optionally determined. For example, the size may be reduced in order to get a more rapid interference determination, or the size may be increased in order to get a more exact interference determination.

In step 407, the particular node exchanges the measured WMA with a WMA of a neighbor node. Then, the neighbor node exchanges the WMA received from the particular node and its own WMA with a WMA of another neighbor node of the neighbor node. When the exchange of WMAs has been completed through the above process, the coordinator node can acquire WMAs of all the nodes directly and indirectly connected to the coordinator node within the sensor network. In step 409, the coordinator node can determine the existence or absence of the interference and acquire the range of the interference by using the energy levels of the acquired WMAs, and can determine if there is an interference, by using the energy contour that can be acquired based on the energy level. Thereafter, in step 411, the coordinator node scans other channels, and switches the current channel to another, which is not influenced by an interference.

Upon finally detecting the occurrence of an interference, the coordinator node can switch the current channel to another, which is not influenced by an interference. A process of switching to a new channel that is not influenced by an interference will be described hereinafter.

Figure 5:
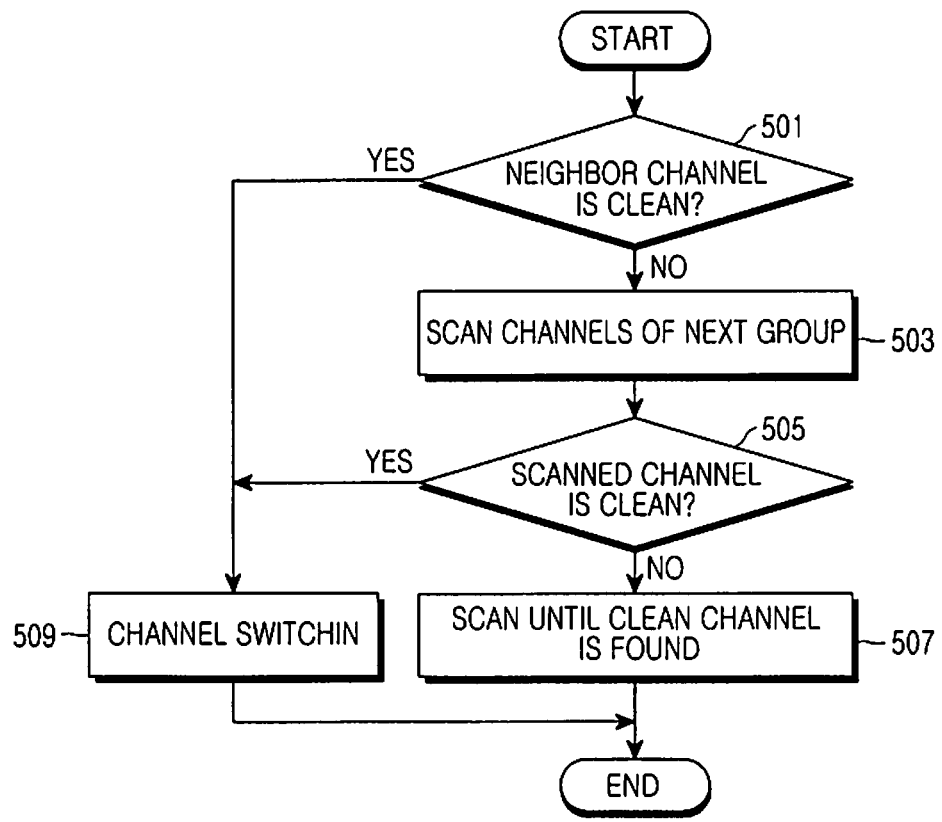
FIG. 5 is a flowchart illustrating a process of scanning a channel which is not influenced by an interference, according to an embodiment of the present invention.

FIG. 5 is a flowchart illustrating a process of scanning a channel, which is not influenced by an interference, according to an embodiment of the present invention.

Referring to FIG. 5, in step 501, the coordinator node determines if neighbor channels adjacent to the channel used by the coordinator node are clean. For example, when No. 4 channel is used, the coordinator node determines if No. 3 and No. 5 channels are influenced by an interference. If a neighbor channel is clean, the coordinator node proceeds to step 509, in which the coordinator node concludes that there is an interference within the sensor network and switches the current channel to the neighbor channel. However, in step 501, if the neighbor channels also are influenced by the interference, the coordinator node determines that there is an interference from a different type sensor network, such as a wireless LAN, and proceeds to step 503, in which the coordinator node determines if there is an interference in the channels set group by group. The group of channels may be differently set according to the type of the interference source. Since the wireless LAN, which is employed as an example of an interference source in the present invention, has a wide bandwidth, a plurality of channels are influenced by the interference in the wireless LAN. Therefore, channels, which are included in the bandwidth range of the wireless LAN, are bundled into one group.

Thereafter, in step 505, the coordinator node determines if channels of the next group are clean. When the channels are clean, the coordinator node proceeds to step 509, in which the coordinator node switches from the current channel to a clean channel for use. When the channels also are influenced by an interference from an interference source in step 505, the coordinator node proceeds to step 507, in which the coordinator node performs the scan until a clean channel is found.

According to the present invention, since the channel switching is performed based on a single channel sensor network, the channels of all the nodes directly or indirectly connected to the coordinator node are simultaneously switched at the time of the channel switching. At this time, a long time and a large quantity of energy may be consumed during the channel switching. Therefore, whether to perform the channel switching may be determined according to the degree of interference, without unconditionally performing the channel switching whenever an interference occurs.

Figure 6:
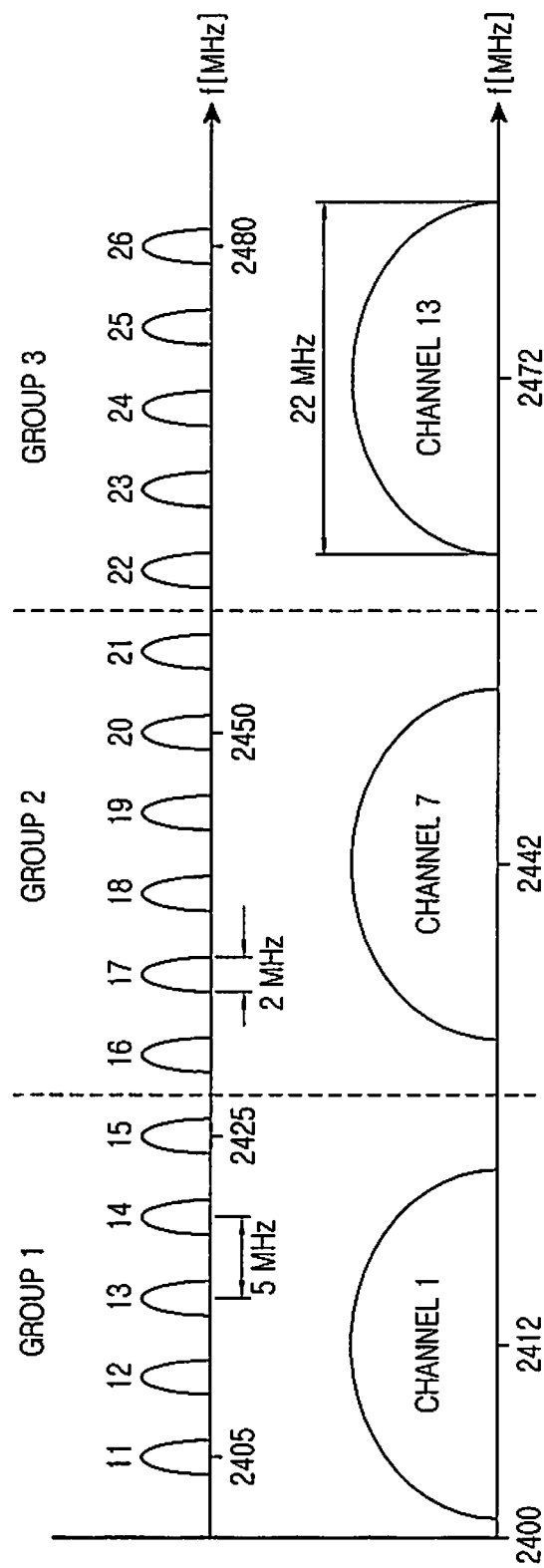
FIG. 6 is a graph for illustrating the scanning of a channel which is not influenced by an interference, according to an embodiment of the present invention.

FIG. 6 is a graph illustrating the scanning of a channel, which is not influenced by an interference, according to an embodiment of the present invention. FIG. 6 is based on an assumption that a Zigbee network is used while a wireless LAN network is used as an interference source.

Referring to FIG. 6, on an assumption that the currently used channel is the No. 13 channel, when an interference is detected, it is first determined if there is an interference in the No. 12 or No. 14 channel, each of which is a neighbor channel of the No. 13 channel. Usually, available channels of the IEEE 602.15 system using the Zigbee network are a total of 16 channels from the No. 11 channel to the No. 26 channel. If these channels are randomly scanned and subjected to the interference determination, too much time and energy is required for the scanning and determination.

As shown in FIG. 6, available channels can be grouped according to the channels of a wireless LAN, which is an interference source. Therefore, when there is no interference in the No. 12 or No. 14 channel, it is concluded that the interference is caused by an interference source within the sensor network other than the wireless LAN, and the channel is switched to the No. 12 or 14 channel. However, when there is an interference in the No. 12 or No. 14 channel, it is concluded that the interference is caused by the wireless LAN and it is determined if there is an interference in a central channel of the next group, without determining if there is an interference in the No. 11 or No. 15 channel. When an interference is detected in the central channel of the next group, it is then determined if there is an interference in a neighbor channel adjacent to the central channel of the next group. Then, when an interference is detected again, it is determined if there is an interference in the next group.

According to the present invention, it is possible to achieve a channel switching before an actual data communication at the time of interference prediction without the addition of new hardware. Therefore, by the present invention, it is possible to improve the reliability of a radio link, to predict an interference by an interference source by collecting interference information of neighbor nodes, and to prevent unnecessary channel scanning through interference prediction, thereby minimizing energy consumption and required time for wireless channel scanning due to the wireless channel scanning.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of avoiding a channel interference in a single channel sensor network, the method comprising:
   receiving energy of nodes of the sensor network by a coordinator node according to periodically measured energy of a channel used by at least one node included in the sensor network, and exchanging the measured energy of the channel with a measured energy of a neighbor node of the at least one node;

determining if there is an interference by using the exchanged measured energies and the received energy of nodes of the sensor network, by the coordinator node, which is a highest node of the at least one node; and when it is determined that there is interference, switching a channel influenced by the interference to a channel which has been scanned by the coordinator node and is not influenced by the interference, thereby avoiding the influence of the interference.

2. The method of claim 1, wherein the measured energy of the channel corresponds to a measured intensity of a signal received within a bandwidth of the channel.

3. The method of claim 1, wherein the measured energy of the channel is applied to a Weighted Moving Average (WMA), and wherein determining if there is interference is performed by comparing the applied WMA with a preset threshold, and the WMA is defined by $$WMA = \frac{w_{i,t-k} x_{i,t-k} + \ldots + w_{i,t} x_{i,t}}{w_{i,t-k} + \ldots + w_{i,t}},$$

wherein k refers to the size of a WMA window, $x_{i,t}$ refers to an energy value on a channel measured through an Energy Detection (ED) scan at node i and time t, and $w_{i,t}$ refers to a weight for the WMA.

4. The method of claim 3, wherein when the WMA is larger than the preset threshold, the coordinator node receives a report that a channel used by the at least one node is influenced by interference from the at least one node.

5. The method of claim 3, wherein the coordinator node plots an energy contour based on the WMAs of nodes of the sensor network, and determines a state of the channel if there is interference, based on the energy contour.

6. The method of claim 1, wherein an interference-free new channel is searched for by determining whether there is any interference from a neighbor channel of a channel used by the at least one node.

7. The method of claim 6, wherein when the neighbor channel is also influenced by interference, available channels are bundled into groups based on a bandwidth of an interference source, and a central channel of a neighbor group of a group including the bandwidth of the interference source is scanned.

8. The method of claim 1, wherein channel switching to the channel not influenced by an interference is performed based on a determination of the coordinator node.

9. A system for avoiding a channel interference in a single channel sensor network, the system comprising:

a coordinator node for receiving energy of nodes of the sensor network according to periodically measured energy of a channel used by at least one node included in the sensor network, and exchanging the measured energy of the channel with a measured energy of a neighbor node of the at least one node, determining based on the exchanged measured energies and the received energy of nodes of the sensor network if there is an interference, and, when it is determined that there is interference, searching for a channel which is not influenced by the interference and switching a channel influenced by the interference to the channel which is not influenced by the interference.

10. The system of claim 9, wherein the measured energy of the channel is applied to a Weighted Moving Average (WMA), and wherein determining if there is interference is performed by comparing the applied WMA to preset threshold, and the WMA is defined by $$WMA = \frac{w_{i,t-k} x_{i,t-k} + \ldots + w_{i,t} x_{i,t}}{w_{i,t-k} + \ldots + w_{i,t}},$$

wherein k refers to the size of a WMA window, $x_{i,t}$ refers to an energy value on a channel measured through an ED scan at node i and time t, and $w_{i,t}$ refers to a weight for the WMA.

11. The system of claim 10, wherein the coordinator node plots an energy contour based on the WMAs of nodes of the sensor network, and determines a state of the channel if there is interference, based on the energy contour.

12. The system of claim 9, wherein channel switching to the channel which is not influenced by the interference is performed based on a determination by the coordinator node.

* * * * *